May 14, 1935. W. J. DE WITT 2,001,055
FISH BAIT
Filed July 27, 1933
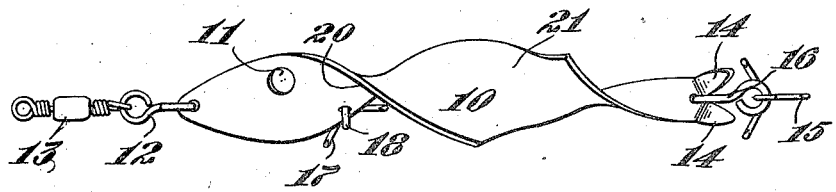
Fig.1
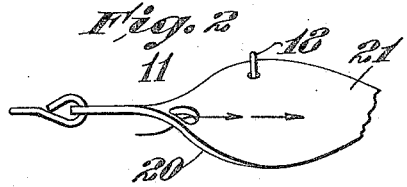
Fig.2
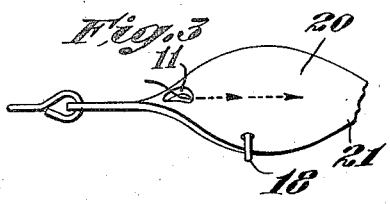
Fig.3
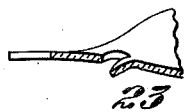
Fig.5
Fig.4
Inventor
William J. DeWitt
by Roberts, Cushman & Woodberry
Att'ys.

Patented May 14, 1935

2,001,055

UNITED STATES PATENT OFFICE 2,001,055

FISH BAIT

William J. De Witt, Auburn, N. Y., assignor to Shoe Form Co., Inc., Auburn, N. Y., a corporation of New York Application July 27, 1933, Serial No. 682,437

2 Claims. (Cl. 43—47)

This invention relates to an improvement in fish bait, and has for its primary object to provide a strip of celluloid or similar material suitably colored and so formed that, when pulled or drawn through the water, it will roll or rotate while continuing its travel along a substantially straight course.

A further object of this invention is to provide a fish bait consisting of a spirally twisted strip of material, celluloid preferred, having near its head end an aperture which simulates the eye of a fish and which, as will be pointed out below, assists to hold the bait to its course.

Other objects will appear from a consideration of the following description and of the drawing which forms a part thereof and in which, Fig. 1 is a side elevation of a fish bait embodying this invention;

Figs. 2 and 3 are views of the head end of the bait illustrating two of the positions taken as the bait rotates;

Fig. 4 is an elevational view of the tail end of the bait at an angle to that shown in Fig. 1; and Fig. 5 is a sectional view of a modified detail of the bait.

The fish bait comprises a strip 10 of celluloid or other suitable material duly colored and spirally twisted about its longitudinal axis. In one end, hereinafter referred to as the head end, is formed adjacent one edge an aperture 11 which simulates the eye of a fish. A link 12 at the tip of the head end connects the bait to a swivel 13 to which a leader (not shown) is connected in the usual way. At the other or tail end of the bait are projections 14 which imitate the flukes of a fish tail and, as shown particularly in Fig. 4, bend away from each other. A hook 15 is connected to the tail end between the projections 14 by a link 16 and another hook 17 is connected by a link 18 to the head end at the edge opposite to that adjacent the aperture 11.

The location of the hooks 17 at one side of the strip 10 will obviously unbalance it, and, as the strip is rotated by the water while being drawn along therein, this unbalanced condition will create a tendency of the bait to swing bodily in an orbit from the juncture of the bait with the swivel. The aperture 11, however, counteracts this tendency to a considerable extent by increasing the effective pressure of the water upon the bait. The bait is rotated not only by the impact of the water upon the leading twisted surface 20, but also by the impact of the water upon the posterior twisted surface 21 reaching such second surface through the aperture 11 as indicated by the arrows in Figs. 2 and 3. The result is that the tendency to swing bodily will be less effective due to the higher rate of speed at which the bait will rotate and also to the longitudinally spaced surfaces upon which the water impacts. Furthermore, the aperture as the bait rotates will disturb the water at the head of the bait and, particularly when trolling below the surface, as with a weighted triangle or otherwise, will create air bubbles which will attract the attention of the fish.

Should it be desired to increase the amount of water passing through the aperture the head of the bait may be formed as shown in Fig. 5 wherein the portion ordinarily removed to form the aperture is retained in the form of a flap 23 which deflects additional water from contact with the surface 20 into contact with the surface 21.

While certain embodiments of this invention have been shown and described, it will be understood that I am not limited thereto and that other embodiments may be made without departing from the spirit and scope of this invention as set forth in the following claims.

I claim:

1. A fish bait comprising a swivel, a strip of celluloid or other suitable material connected at its leading end to the swivel, and a hook carried thereby said strip being spirally twisted about its longitudinal axis to provide a plurality of twisted surfaces, the leading surface having an aperture therein, the relative movement of the bait and water causing the rotation of the strip at the swivel both by the impact of the water upon the leading surface and also by the impact upon a posterior twisted surface of water flowing through the aperture in the leading surface.

2. A fish bait comprising a swivel, a strip of celluloid or other suitable material connected at its leading end to the swivel, and a hook carried thereby said strip being spirally twisted about its longitudinal axis to provide a plurality of twisted surfaces, the leading surface having an aperture therein and a flap extending forwardly from one edge of the aperture, the relative movement of the bait and water causing the rotation of the strip at the swivel both by the impact of the water upon the leading surface and also by the impact upon a posterior twisted surface of water flowing through the aperture in the leading surface, the flap thereon acting to deflect through the aperture water which otherwise would not pass therethrough.

WILLIAM J. DE WITT.